(12) United States Patent
Kluczewski

(10) Patent No.: US 8,466,833 B2
(45) Date of Patent: Jun. 18, 2013

(54) MONITORING SYSTEM FOR AN INNER AREA OF A MACHINE

(75) Inventor: Paul Kluczewski, Erlangen (DE)

(73) Assignee: Areva GmbH, Erlangen (DE)

( * ) Notice: Subject to any disclaimer, the term of this patent is extended or adjusted under 35 U.S.C. 154(b) by 0 days.

(21) Appl. No.: 13/477,123

(22) Filed: May 22, 2012

(65) Prior Publication Data

US 2012/0242537 A1    Sep. 27, 2012

Related U.S. Application Data

(63) Continuation of application No. PCT/EP2010/069268, filed on Dec. 9, 2010.

(30) Foreign Application Priority Data

Dec. 9, 2009 (DE) .......................... 10 2009 047 761

(51) Int. Cl.
    *G01S 7/40* (2006.01)

(52) U.S. Cl.
    USPC .............. 342/175; 342/90; 342/173; 342/192

(58) Field of Classification Search
    USPC .................................... 342/90, 173, 175, 192
    See application file for complete search history.

(56) References Cited

U.S. PATENT DOCUMENTS

| 4,200,921 A | 4/1980 | Buckley |
| 4,413,519 A | 11/1983 | Bannister et al. |
| 4,507,658 A | 3/1985 | Keating |
| 5,424,745 A * | 6/1995 | Fonsny ........................... 342/28 |
| 6,437,728 B1 * | 8/2002 | Richardson et al. ............ 342/90 |
| 8,264,400 B2 * | 9/2012 | Yapa et al. ....................... 342/90 |
| 2005/0012265 A1 | 1/2005 | Berlingen et al. |
| 2009/0134884 A1 | 5/2009 | Bosselmann et al. |
| 2010/0156697 A1 * | 6/2010 | Yannone ......................... 342/29 |
| 2012/0242537 A1 * | 9/2012 | Kluczewski ................... 342/192 |

FOREIGN PATENT DOCUMENTS

| DE | 199 50 215 A1 | 6/2001 |
| DE | 102 27 677 A1 | 2/2003 |
| GB | 2 322 988 A | 9/1998 |
| JP | 2005035269 A | 2/2005 |
| WO | 2007/020170 A1 | 2/2007 |

OTHER PUBLICATIONS

International Search Report of PCT/EP2010/069268, Dated Apr. 11, 2011.

* cited by examiner

*Primary Examiner* — John B Sotomayor
(74) *Attorney, Agent, or Firm* — Laurence A. Greenberg; Werner H. Stemer; Ralph E. Locher

(57) ABSTRACT

A monitoring system for an inner area of a machine includes a radar source radiating or injecting radar radiation into the inner area and a radar receiver receiving radar radiation reflected in the inner area and emitting the reflected radar radiation as a received signal. A control and evaluation unit determines an actual signature from the received signal and compares the actual signature to a stored nominal signature representing a fault-free machine. An output unit outputs a fault error signal when a discrepancy between the actual signature and the nominal signature exceeds a tolerance value.

6 Claims, 1 Drawing Sheet

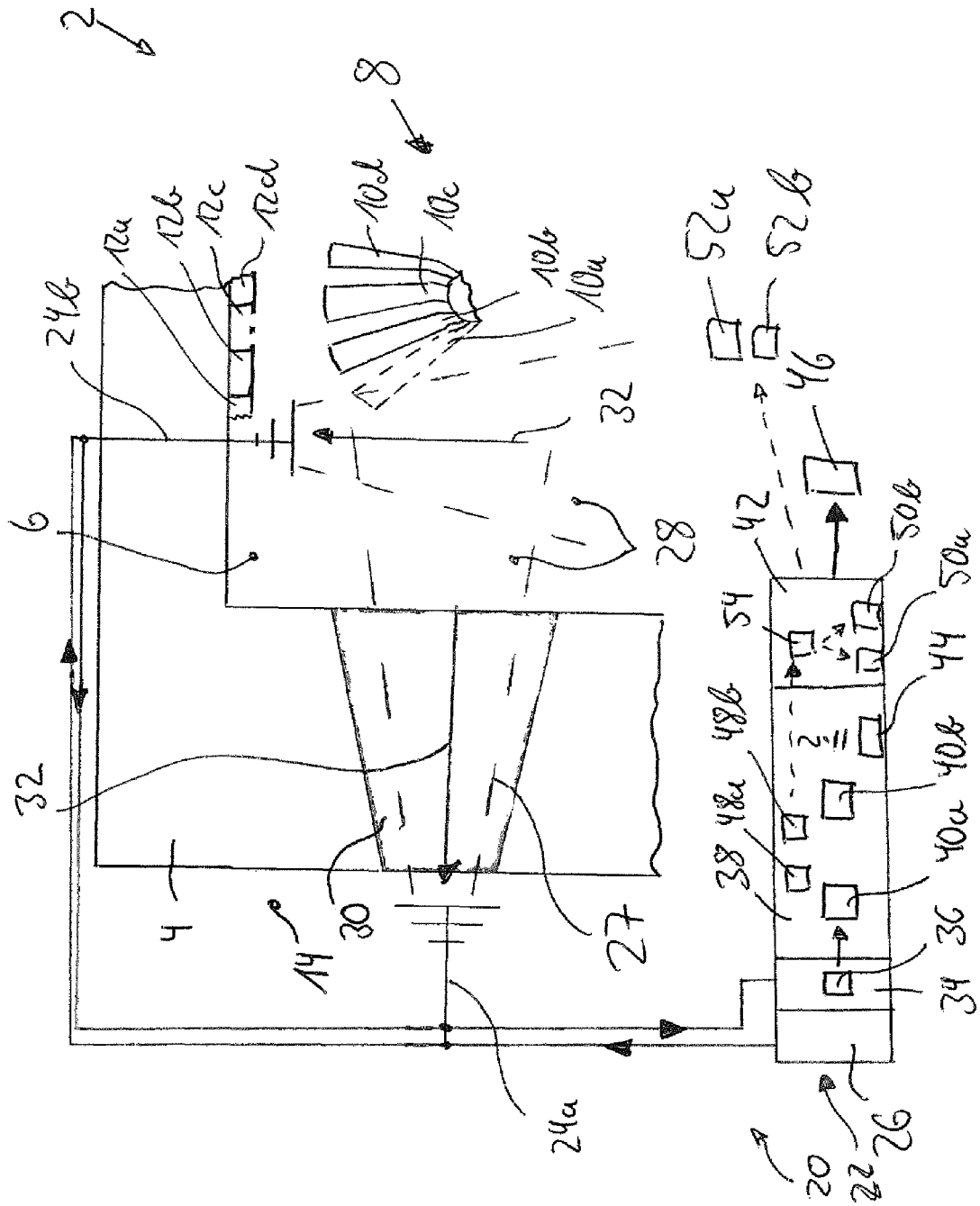

MONITORING SYSTEM FOR AN INNER AREA OF A MACHINE

CROSS-REFERENCE TO RELATED APPLICATION

This is a continuation, under 35 U.S.C. §120, of co-pending International Application No. PCT/EP2010/069268, filed Dec. 9, 2010, which designated the United States; this application also claims the priority, under 35 U.S.C. §119, of German Patent Application DE 10 2009 047 761.6, filed Dec. 9, 2009; the prior applications are herewith incorporated by reference in their entirety.

BACKGROUND OF THE INVENTION

Field of the Invention

The invention relates to a monitoring system for an inner area, space or chamber of a machine.

By way of example, one such machine is a gas turbine having an inner area which is a combustion chamber that contains a turbine wheel. It also refers, for example, to a pump having an inner area which is a pump chamber through which the medium to be pumped flows during operation and which has an impellor wheel.

In the gas turbine mentioned above, the inner area is, for example, clad with heat protection elements which protect a metal casing of the machine against the gas being burned in the combustion chamber. Elements such as those can be entirely or partially detached and can fall into the inner area of the machine. In addition, parts of the turbine blades can also become detached from the turbine wheel or blades can be detached from the impellor wheel, interfering with the operation of the respective machine. Additionally, cracks or fractures can occur on the machine and/or its wall or housing, or other foreign bodies can enter the inner area.

U.S. Pat. No. 4,507,658 discloses a monitoring system for a turbine, through the use of which it is possible to monitor vibration of the turbine blades. For that purpose, the turbine blades are illuminated by a millimetric wave radar system, and a reflected signal is analyzed, in order to identify abnormal vibrations. Heat protection elements falling off or the presence of other foreign bodies in the inner area cannot be signaled by the known monitoring system.

SUMMARY OF THE INVENTION

It is accordingly an object of the invention to provide an improved monitoring system for an inner area of a machine, which overcomes the hereinafore-mentioned disadvantages of the heretofore-known systems of this general type.

The invention is based on the concept of providing a contactless monitoring system which can also detect the loose parts or foreign elements mentioned above in inner areas of machines. The technology used in this case for the monitoring system must have good position resolution in order, for example, to make it possible to detect the absence of individual heat protection elements or parts thereof in a gas turbine. At the same time, the monitoring system must be able to penetrate well through media of different consistency, for example gases, vapors and liquids, in order to make it possible to obtain information from the inner area of the machine.

With the foregoing and other objects in view there is provided, in accordance with the invention, a monitoring system for an inner area of a machine. The monitoring system comprises a radar source configured to inject or radiate radar radiation into the inner area and a radar receiver configured to receive radar radiation reflected in the inner area and to emit the radar radiation as a received signal. A control and evaluation unit is configured to determine an actual signature from the received signal and to compare the actual signature with a stored nominal signature representing a fault-free machine. An output unit is configured to output a fault signal upon a discrepancy between the actual signature and the nominal signature exceeding a tolerance level.

This monitoring system includes a radar source, which injects or radiates radar radiation into the inner area. Therefore, in this case, it is not just a turbine blade but the entire inner area of the machine which is irradiated. One problem in this case is that the inner area is generally completely surrounded by a metallic housing. The entire inner area reflects the radar radiation. The previously-known radar technology is always based on there being only a single reflective element (for example an aircraft in otherwise empty air space) to locate in an irradiated spatial area. Its echo is then used for radar imaging. The use of radar technology with overall irradiation of the inner area therefore involves a departure from the known procedure.

A radar receiver receives the radar radiation reflected in the inner area and emits a received signal corresponding to the received radar radiation. The monitoring system furthermore includes a control and evaluation unit. Likewise as a departure from conventional radar technology, this control and evaluation unit now uses the received signal to determine an actual signature, for example by digital signal processing. This is not primarily used for imaging but is intended to determine only characteristics of the received signal which are correlated with the geometry of the inner area in such a way that discrepancies in the inner area which are intended to be observed (for example a missing heat protection element, a missing part of a turbine blade, a crack or fracture in a machine part or some other foreign element in the inner area) lead to a change in the actual signature.

By way of example, the actual signature is the result of a time or frequency signal analysis of the received signal. It is feasible in this case to evaluate the amplitude and/or phase of the received signal, or to search for frequency shifts in the spectrum, and/or to carry out a Doppler evaluation. In the time domain, a change in the inner area geometry can be detected, for example, by delay-time measurement from transmission to reception of a UWB radar pulse. On the other hand, changes in the inner area can be deduced by a change in the spectral distribution of the UWB radar pulse.

The control and evaluation unit also has a nominal signature having a character which corresponds to the actual signature but which is based on or represents a machine that is known to be fault-free. In other words, the nominal signature is a signature which is determined as the actual signal from the received signal from a machine which is known to be fault-free. The monitoring system furthermore includes an output unit. This outputs a fault signal when a discrepancy between the actual signature and the nominal signature exceeds a tolerance level. The nominal signature may, for example, be determined through the use of a so-called channel sounding technique.

In other words, the monitoring system does not produce an actual real image, for example comparable to a conventional radar image, of the inner area of the machine, but an abstract actual signature, which includes geometric details or material characteristics of the inner area with adequate position resolution, as information. The monitoring system then observes a discrepancy between the actual signature measured repeatedly during operation of the machine and the nominal signature, which corresponds to the fault-free machine. This measure makes it possible to use radar technology, which is unsuitable for complete spatial monitoring, in the metallic inner area of a machine, as well.

In order to detect a change in the received signal, it is therefore necessary to define a nominal signature for normal operation, that is to say operation which is known to be fault-free. Changes in the received signal, for example as a result of density fluctuations and turbulences of a medium located in the inner area of the machine, can be taken into account in this case. If significant changes occur in the signature which, for example, are caused by a loose element or a defect in the surface structure of the inner area or the outer envelope of the machine or the like, this leads to a discrepancy between the actual signature and the nominal signature, beyond the media fluctuations, etc. mentioned above. In this way, a fault situation in the machine is identified, and a fault signal is correspondingly output.

The monitoring system according to the invention makes it possible to examine not only the above-noted inner areas of the machines mentioned above, but in general inner areas of technical installations, for example even a tunnel in a mine, for extraordinary changes, since only the radar source need be constructed appropriately to allow corresponding position resolution for abnormal changes to be observed in the inner area.

The method also makes it possible to monitor, in the inner area, the medium which may be flowing in the inner area of the machine, if the radar radiation passes through the medium and changes the actual signature in the event of a fault, for example in the case of a lack of medium or foreign bodies also being transported.

The monitoring system implements a novel radar method, in which not only isolated echoes from individual points, for example from aircraft in an airspace, are received, but a radar echo thrown back from the entire area. This radar echo in the form of the received signal is also not evaluated in an imaging form, but abstractly. Actual imaging by the method of the inner area in the form of a realistic image, or an image which can be evaluated in the form of an image, that is to say by an observer, is desirable, but not necessary, since the aim of the system is only to identify a fault in the inner area. It is sufficient to output a digital yes/no signal as a fault signal, corresponding to "fault free" or "machine fault." Complex processing of the received signal is, of course, also feasible, in which the actual signature actually produces a specific image of the inner area, but this is not absolutely necessary.

In accordance with another preferred feature of the invention, the radar radiation is narrowband (for example in the microwave range) or ultra wideband (UWB) radar radiation. Radar technology is proven for this frequency range, and has been widely proven for radar applications. The radar source emits radar radiation, for example in the form of a narrowband or sinusoidal signal, which is reflected in the inner area of the machine and is received by antennas and the radar receiver. Evaluation is generally carried out in the frequency range in this case. The narrowband radar is, for example, in the form of an FMCW (Frequency-Modulated Continuous Wave) radar. The FMCW radar offers the advantage of refinement of the capability to detect moving parts.

In the case of a UWB radar, a short radar pulse is in each case emitted, which has a broad frequency spectrum, for example with a bandwidth of about 1 GHz. The signal is therefore formed of pulses which are as short as possible in the time domain. In this case as well, the radar signal reflected in the inner area is received and processed, and an actual signature is produced in a corresponding manner from the received signal. The changed pulse form of the received signal in the time domain makes it possible to deduce the configuration and geometry of the heat protection elements. In practice, a resolution in the centrimetric range appears to be realistic in this case. In this case, by way of example, the evaluation is carried out on the basis of the pulse shape, for example using a matched-filter process. A UWB radar is also suitable for rugged environments. In this case, different radiations are suitable for different applications or media which may be found in machine inner areas. For example, a narrowband radar is suitable for gas fillings or vapor fillings. In contrast, UWB radar can be used for virtually all media, that is to say also for liquids and solids.

In accordance with a further preferred feature of the invention, the control and evaluation unit determines the actual signature on the basis of a time-domain or frequency-domain evaluation of injected and reflected radar radiation. In other words, the actual signature is determined on the basis of the phase angle and/or the delay time and/or the spectral signal distribution of injected and reflected radar radiation. In contrast to pure delay-time measurements, evaluation of the phase angle results in additional information relating to the inner area being obtained, and this can be used for the actual signature. When radar radiation strikes metal, it is reflected. However, if it strikes a material which is only partially reflective, for example a non-metallic surface coating, and then strikes metal, it is first of all shifted in phase, and is then reflected. For example, this results in a change in a UWB radar pulse, in the form of distortion. This phase offset can be determined and can have a considerable effect on the validity of the monitoring system for fault identification by comparison of actual and nominal signatures. In other words, the evaluation of the phase angle therefore results in a considerable improvement in the monitoring system.

In accordance with an added preferred feature of the invention, the monitoring system contains a plurality of antennas, which are connected to the radar source and/or to the control and evaluation unit, for respective transmission and/or reception of the radar radiation.

The use of a plurality of antennas results in a so-called antenna array. A large amount of additional information can be obtained by correlation of the transmitted and received signals of a plurality of antennas. The transmission of radar signals from a plurality of antennas, which inject or irradiate into the inner area of the machine at different points, and the evaluation of signals received by different antennas, makes it possible to take into account direction-dependent reflections in the inner area in the actual signature. By way of example, this means that it is possible to monitor individual heat protection elements, specifically for presence or absence, in the inner area of a gas turbine. In other words, therefore, the use of an antenna array provides better position resolution for a specific spatial area which is irradiated by the radar radiation. An antenna array also makes it possible to expect more detailed information in the actual signature in terms of the aforementioned multiplicity of reflections of the radar radiation obtained in the inner area.

It is possible to deduce the magnitude or the extent of a fault from the magnitude, for example amplitude, of the discrepancy between the actual signature and the nominal signature. The antenna array which has been mentioned also makes it possible to deduce the location of the fault in the inner area. For example, if only a single heat protection element or fragment thereof has become detached in a gas turbine on the basis of the amplitude of the difference between the actual signature and the nominal signature, and if, on the basis of the antenna array information, in the actual signature, this is located at a non-critical point in the inner area, then the fault signal evaluation can be used to decide not to replace the heat protection element until the next maintenance interval, and not to carry out an emergency shutdown of the machine.

In accordance with an additional preferred feature of the invention, an antenna for transmission and/or reception of radar radiation is disposed in the inner area. In order to achieve maximum irradiation of the inner area by radar radiation, that is to say to ensure that the radar radiation reaches every point on the surface of the inner area, it is advantageous to place a plurality of antennas in the inner area, for example distributed uniformly. For this purpose, the antennas are either fitted behind an intermediate layer composed of electromagnetically permeable materials, or are fitted directly in the inner area of a machine. The use of an intermediate layer makes it possible for the radar radiation to penetrate into the inner area of a machine, with the antenna itself being protected against high temperatures, etc.

In accordance with yet another feature of the invention, antennas are disposed in the outer area of the machine, and a pass or passage area for the radar radiation is disposed in the machine wall, in a beam path from the antenna to the inner area. By way of example a pass or passage area such as this may be a quartz window that is introduced into the machine wall. Due to the nature of the radar radiation, there is no need to be concerned about a loss of performance of the monitoring system by the antenna, the intermediate layer or the inner surface of the pass or passage area becoming dirty, for example as a result of an oxide layer or organic dirt.

When positioning the antennas, care must always be taken to ensure that the electronics associated with the antennas are protected against heat, radiation and chemical influences. In one embodiment, this could be achieved by placing an electronic component of the antenna separately from the antenna itself.

In accordance with a concomitant preferred feature of the invention, the control and evaluation unit determines a difference signature between the nominal signature and the actual signature. Furthermore, a plurality of stored characteristic difference patterns for a respective characteristic fault situation of the machine are stored in the monitoring system. For example, if it is found that a heat protection element is faulty or that a turbine blade in a gas turbine has been damaged, a difference signature between the nominal signature and the actual signature is determined, and is stored as a characteristic difference pattern for the fault situation of "missing heat protection element" or "damaged turbine blade." During operation of the machine, the output unit then in each case checks whether or not a currently determined difference signature corresponds to a respective difference pattern, within a tolerance range, and outputs a fault signal associated with the respective difference pattern. In this embodiment, therefore, the monitoring system produces not only a yes/no fault signal but, in other words, a fault code for example for "missing heat protection element," "damaged turbine blade," etc.

Appropriate difference patterns are determined, for example, by experiments or by evaluation and successive learning of specifically occurring difference patterns. This is because, if it is known precisely what fault is associated with an actual signature, then a characteristic difference pattern can be determined from the corresponding difference signature.

Other features which are considered as characteristic for the invention are set forth in the appended claims.

Although the invention is illustrated and described herein as embodied in a monitoring system for an inner area or chamber of a machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SINGLE VIEW OF THE DRAWING

The figure of the drawing is a fragmentary, diagrammatic, longitudinal-sectional view of a machine having a monitoring system according to the invention.

DETAILED DESCRIPTION OF THE INVENTION

Referring now in detail to the single FIGURE of the drawing, there is seen a machine 2 which, in the illustrated example, is a gas turbine having a metallic machine wall 4 which surrounds an inner area, space or chamber 6. The inner area 6 contains a turbine wheel 8 with turbine blades 10a-d. The machine wall 4 is clad toward the inner area 6 by heat protection elements 12a-d (only a small number of elements are illustrated by way of example in each case). The machine 2 is surrounded by an outer area, space or chamber 14.

The machine 2 has an associated monitoring system 20. This system includes a central unit 22 and a multiplicity of antennas, of which only antennas 24a, b are illustrated, by way of example. In this case, the antenna 24a is disposed in the outer area 14 and the antenna 24b is disposed in the inner area 6. The central unit 22 contains a radar source 26 which operates the antennas 24a, b over schematically illustrated connecting lines, so that the antennas 24a, b transmit radar radiation 28. Since the machine wall 4 is composed of metal, which the radar radiation 28 cannot pass through, a passage or pass-through area 30 in the form of a quartz window is incorporated in the machine wall 4, between the antenna 24a and the inner area 6, in a beam path 27 indicated by dashed lines in the figure.

The radar radiation 28 fills the entire inner area 6, in other words it reaches the entire inner surface, that is to say the surface facing the inner area 6, of the machine wall 4 and of the heat protection elements 12a-d and the turbine wheel 8. The radar radiation 28 is reflected by the just-mentioned elements. Reflected radar radiation 32 (symbolized by arrows) is received again by the antennas 24a, b, and is passed over a non-illustrated control line to a radar receiver 34 for the central unit 22. The radar receiver 34 uses the reflected radar radiation 32 to produce a received signal 36, which it transmits to a control and evaluation unit 38 in the central unit 22.

The control and evaluation unit 38 uses the received signal 36 to produce an actual signature 40a. A nominal signature 40b is also stored in the control and evaluation unit 38. The nominal signal 40b corresponds to the actual signature 40a when the machine 4 is in a fault-free state. An output unit 42, which is associated with the central unit 22, checks whether the actual signature 40a does or does not correspond to the nominal signature 40b, within a tolerance level 44 for permitted discrepancies. In the event of correspondence, it outputs a fault signal 46 with a "fault-free operation" value. In this example, the fault signal may assume two values, specifically "fault-free operation" or "fault."

A fault signal 46 with the value "fault" is generated, for example, in the following case:

The turbine blade 10a is partially destroyed or a part of it has become detached from the turbine wheel 8 during operation of the machine 4. The radar radiation 28 injected or radiated into the inner area 6 is reflected further by the missing turbine blade 10a in a different manner than in the case of an intact turbine blade 10a. The reflected radar radiation 32 is therefore changed in comparison to the fault-free situation, as a result of which the received signal 36 also changes. Due to this, the actual signature 40a also changes and, following the fault situation, no longer corresponds to the previously-measured actual signature 40a. In particular, the actual signature 40a therefore also differs from the nominal signature 40b by more than the tolerance level 44. The output unit 42 detects this discrepancy and outputs the fault signal 46 as a "fault."

In contrast, in an alternative fault situation, the turbine wheel 8 is intact, but the heat protection element 12c has been detached. The radar radiation 28, which is injected without any change, is thus reflected in yet another manner, thus in the end resulting in yet another actual signature 40a. This other actual signature 40a also differs from the nominal signature 40b by more than the amount tolerated by the tolerance level 44, and the fault signal 36 is once again output as a "fault."

In an alternative embodiment, a difference signature 48a, b is always produced from the actual signature 40a and the nominal signature 40b, for example by subtraction. Characteristic difference patterns 50a, b are also stored in the output unit 42. In this embodiment, in the event of a fault, that is to say in the event of the above-mentioned discrepancy between the actual and nominal signatures 40a, b, the output unit 42 compares the respective difference signature 48a, b with the characteristic difference pattern 50a, b. The characteristic difference pattern 50a, b is associated with respective characteristic fault situations of the machine 2 in this case. For example, the difference pattern 50a may correspond to a typical difference signature for the absence of a turbine blade 10a-d, and the difference pattern 50b may correspond to a characteristic difference signature for a missing heat protection element 12a-d.

In the respective situation in which the currently determined difference signature 48a, b corresponds to a corresponding difference pattern 50a, b within a tolerance level 54, a specific fault signal 52a, b is output alternatively or in addition to the fault signal 46. This not only provides the information that the machine 2 has a fault, but also what is the nature of this fault. In the case of the fault signal 52a, this is the "missing heat protection element" and in the case of the fault signal 52b, this is the "damaged turbine blade."

In other words, not only is a fault identified in the machine 2, but it is classified on the basis of its type, by examining whether or not the current difference signature 48a, b corresponds to a typical difference pattern 50a, b.

The invention claimed is:

1. A monitoring system for an inner area of a machine, the monitoring system comprising:
    a radar source configured to inject radar radiation into the inner area;
    a radar receiver configured to receive radar radiation reflected in the inner area and to emit the radar radiation as a received signal;
    a control and evaluation unit configured to determine an actual signature from the received signal and to compare the actual signature with a stored nominal signature representing a fault-free machine, said control and evaluation unit being configured for determining a difference signature from the nominal signature and the actual signature, said control and evaluation unit having a plurality of stored characteristic difference patterns for respective characteristic fault situations of the machine; and
    an output unit configured for outputting a respective fault signal associated with a fault situation when the difference signature corresponds to a respective one of said respective difference patterns within a tolerance level.

2. The monitoring system according to claim 1, wherein the radar source is configured to output narrowband or UWB radar radiation.

3. The monitoring system according to claim 1, wherein said control and evaluation unit is configured to determine the actual signature on a basis of at least one of a phase angle or a delay time or a spectral signal distribution of the reflected radiation and the injected radiation.

4. The monitoring system according to claim 1, which further comprises a plurality of antennas connected to at least one of said radar source or said control and evaluation unit for at least one of respective transmission or reception of the radar radiation.

5. The monitoring system according to claim 4, wherein said plurality of antennas includes an antenna disposed in the inner area of the machine.

6. The monitoring system according to claim 5, wherein:
    said plurality of antennas includes an antenna disposed in an outer area of the machine having a beam path from said antenna disposed in the outer area to the inner area; and
    a passage area disposed in a machine wall of the machine for passage of the radar radiation in the beam path from said antenna disposed in the outer area to the inner area.

* * * * *